(12) United States Patent
Mallick et al.

(10) Patent No.: US 8,559,909 B2
(45) Date of Patent: Oct. 15, 2013

(54) TECHNIQUES FOR SUPPORTING EMERGENCY COMMUNICATIONS IN WIRELESS COMMUNICATION SYSTEM

(75) Inventors: Prateek Basu Mallick, Bangalore (IN); Nitin Jain, Bangalore (IN); Venkata Raju, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 222 days.

(21) Appl. No.: 12/728,696

(22) Filed: Mar. 22, 2010

(65) Prior Publication Data

US 2010/0240338 A1    Sep. 23, 2010

(30) Foreign Application Priority Data

Mar. 20, 2009 (IN) .............................. 637/CHE/2009

(51) Int. Cl.
*H04M 11/04* (2006.01)
*H04W 4/00* (2009.01)

(52) U.S. Cl.
USPC ................. 455/404.1; 455/426.1; 455/552.1

(58) Field of Classification Search
USPC ....................... 455/426.1, 552.1, 553.1, 404.1
See application file for complete search history.

(56) References Cited

U.S. PATENT DOCUMENTS

| | | | |
|---|---|---|---|
| 2005/0101288 A1* | 5/2005 | Hulkkonen et al. | 455/404.1 |
| 2007/0032219 A1* | 2/2007 | Rudolf et al. | 455/404.1 |
| 2008/0026728 A1* | 1/2008 | Snapp et al. | 455/414.1 |
| 2008/0102784 A1* | 5/2008 | Mittal et al. | 455/404.1 |
| 2009/0191841 A1* | 7/2009 | Edge et al. | 455/404.1 |

OTHER PUBLICATIONS

3GPP TR 23.869 V0.7.0 Technical Specification 3rd Generation Partnership Project; Technical Specification Group Services and System Aspects; Support for IMS Emergency Calls over GPRS and EPS; (Release 9), Feb. 2009.*
3GPP TS 24.229 V8.6.0, dated Dec. 2008, p. 125.*

\* cited by examiner

*Primary Examiner* — Lester Kincaid
*Assistant Examiner* — Daniel Lai
(74) *Attorney, Agent, or Firm* — Jefferson IP Law, LLP

(57) ABSTRACT

Methods and apparatus for supporting emergency communications are provided. A method for a Radio Access Network (RAN) serving at least one Core Network (CN) to support emergency communications of a User Equipment (UE) includes determining whether at least one CN in a shared network environment supports emergency communications, if it is determined that the at least one CN in the shared network environment supports emergency communications, transmitting an emergency call support indication to the UE indicating that emergency communications are supported, receiving a request for emergency communications from the UE, and routing the request for emergency communications to another CN that supports emergency communications in the shared network environment, if a given CN does not support emergency communications.

10 Claims, 5 Drawing Sheets

TECHNIQUES FOR SUPPORTING EMERGENCY COMMUNICATIONS IN WIRELESS COMMUNICATION SYSTEM

PRIORITY

This application claims the benefit under 35 U.S.C. §119 (a) of an Indian provisional patent application filed on Mar. 20, 2009 in the Indian Patent Office and assigned Serial No. 637/CHE/2009, the entire disclosure of which is hereby incorporated by reference.

BACKGROUND OF THE INVENTION

1. Field of the Invention

Aspects of the present invention relate to techniques for use in a wireless communication system. More particularly, aspects of the present invention relate to techniques for supporting emergency communications in a wireless communication system.

2. Description of the Related Art

Wireless communication networks provide various communication services such as a voice service, a video service, a packet data service, a messaging service, a broadcast service, etc. These wireless communication networks may be multiple-access networks capable of supporting communications for multiple users by sharing the available network resources. Examples of such multiple-access networks include a Code Division Multiple Access (CDMA) network, a Time Division Multiple Access (TDMA) network, a Frequency Division Multiple Access (FDMA) network, an Orthogonal FDMA (OFDMA) network, and a Single-Carrier FDMA (SC-FDMA) network.

Services provided by the wireless communication networks may include the ability to make and receive calls including voice calls and emergency voice calls and the ability to send and receive data including data transmitted using the Internet Protocol (IP). To make and receive voice calls with efficient usage of network resources (e.g. wireless spectrum and wireline signaling and transmission lines), networks and terminals may support Voice over IP (VoIP) for normal calls and for emergency calls. In a case of emergency VoIP calls, networks that support radio access according to 3rd Generation Partnership Project (3GPP) and 3GPP2 standards (which includes networks that employ Global System for Mobile communications (GSM), Wideband CDMA (WCDMA), cdma2000 Evolution-Data Optimized (EvDO) and Long Term Evolution (LTE)) may employ a solution in which support is provided using an IP Multimedia Subsystem (IMS). When the IMS is employed, the VoIP emergency call is sometimes referred to as an IMS Emergency Call as call control and call signaling is supported by the IMS in the network that is serving the user's terminal. In this context, a terminal may also be known as a mobile station or User Equipment (UE).

A UE may be invoked by a user to place a VoIP emergency call with a wireless communication network. The UE may go through several phases, such as registration and call establishment, in order to originate the VoIP emergency call. The UE may register with the wireless network so that the UE can be authenticated to the wireless communication network and the wireless communication network may obtain pertinent information such as verified identification information and a verified call back number. The UE may then perform call establishment in order to connect the call to an appropriate entity, e.g., a Public Safety Answering Point (PSAP), which can service the emergency call.

However, not all emergency calls are supported by all wireless communication networks. For example, in 3GPP LTE systems, the emergency calls are not supported in release 8, but emergency calls should be supported in release 9. However, a network version is not broadcast to the UE in either release 8 or release 9. Thus, if a release 9 UE wants to perform an emergency call in a given cell, the UE cannot be sure that an emergency call can be established in the cell, since it is not sure of the network version. In such a case, it is difficult for the UE to determine if it is possible to make an emergency call in the current cell. Therefore a technique should be devised that allows the UE to determine if emergency calls are possible in the given cell regardless of the network version.

Therefore, a need exists for techniques for supporting emergency communications in wireless communication system.

SUMMARY OF THE INVENTION

An aspect of the present invention is to address at least the above-mentioned problems and/or disadvantages and to provide at least the advantages described below. Accordingly, an aspect of the present invention is to provide techniques for supporting emergency communications in wireless communication system.

Another aspect of the present invention is to provide a technique for User Equipment (UE) to determine if emergency calls are supported in a given cell regardless of a network version.

Yet another aspect of the present invention is to provide a technique for, if emergency calls are determined not to be supported in a given cell, selecting another cell with which the UE may possibly establish an emergency call.

In accordance with an aspect of the present invention, a method for a Radio Access Network (RAN) serving at least one Core Network (CN) to support emergency communications of a UE is provided. The method includes determining whether at least one CN in a shared network environment supports emergency communications, if it is determined that the at least one CN in the shared network environment supports emergency communications, transmitting an emergency call support indication to the UE indicating that emergency communications are supported, receiving a request for emergency communications from the UE, and routing the request for emergency communications to another CN that supports emergency communications in the shared network environment, if a given CN does not support emergency communications.

In accordance with another aspect of the present invention, a method for a UE to support emergency communications with a RAN serving at least one CN is provided. The method includes receiving an emergency call support indication from the RAN indicating whether emergency communications are supported in at least one CN in a shared network environment, determining if emergency communications are supported in any of the at least one CN in the shared network environment based on the received emergency call support indication, determining if emergency communications need to be established, and if it is determined that emergency communications are supported in any of the at least one CN of the shared network environment and also if it is determined that emergency communications need to be established, transmitting a request for emergency communications to the RAN.

In accordance with yet another aspect of the present invention, a RAN apparatus serving at least one CN to support emergency communications of a UE is provided. The apparatus includes a transmitter for transmitting signals to the UE, a receiver for receiving signals from the UE, a network transceiver for transmitting and receiving signals to and from the at least one CN, and a controller. The controller is for controlling the receiver, transmitter, and network transceiver, for controlling to determine whether at least one CN in a shared network environment supports emergency communications, for controlling, if it is determined that any of the at least one CN in the shared network environment supports emergency communications, to transmit an emergency call support indication to the UE indicating that emergency communications are supported, for controlling to receive a request for emergency communications from the UE, and for controlling to route the request for emergency communications to another CN that supports emergency communications in the shared network environment, if a given CN does not support emergency communications.

In accordance with still another aspect of the present invention, a UE apparatus to support emergency communications with a RAN serving at least one CN is provided. The apparatus includes a transmitter for transmitting signals to the RAN, a receiver for receiving signals from the RAN, and a controller. The controller is for controlling the receiver and transmitter, for controlling to receive an emergency call support indication from the RAN indicating whether emergency communications are supported in at least one CN in a shared network environment, for controlling to determine if emergency communications are supported in any of the at least one CN in the shared network environment based on the received emergency call support indication, for controlling to determine if emergency communications need to be established, and for controlling, if it is determined that emergency communications are supported and also if it is determined that emergency communications need to be established, to transmit a request for emergency communications to the RAN.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

Figure 1:
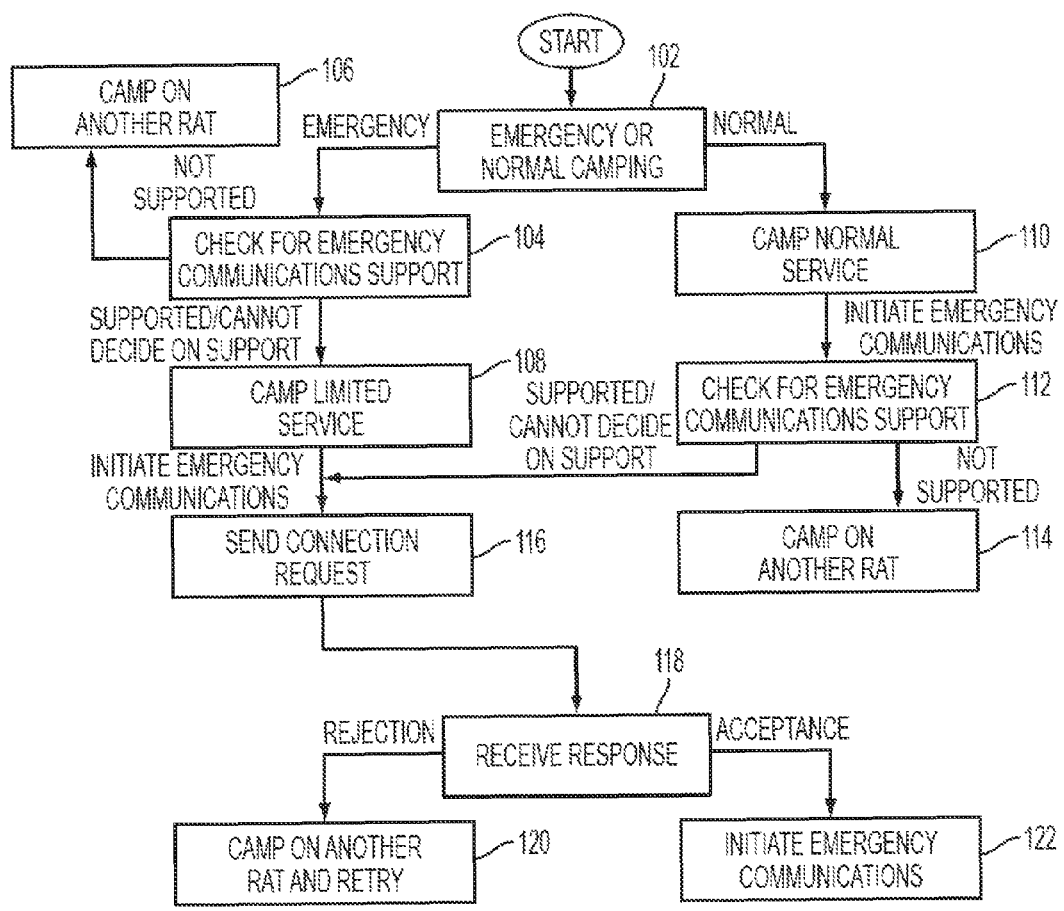
FIG. 1 is a flowchart for accessing emergency communications according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein may be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It should be understood that the following description might refer to terms utilized in various standards merely for simplicity of explanation. For example, the following description may refer to terms utilized in at least one of a $3^{rd}$ Generation Partnership Project (3GPP) Long Term Evolution (LTE) standard, a 3GPP2 Ultra Mobile Broadband (UMB) standard, and an Institute of Electrical and Electronics Engineers (IEEE) 802.16m standard, etc. However, this description should not be interpreted limiting the present invention to application with any particular standard. Independent of the mechanism used to implement any of the techniques described herein, it is advantageous for these techniques to conform to a standardized mechanism.

Exemplary embodiments of the present invention include techniques for supporting emergency calls and emergency services in a wireless communication system. Hereafter, emergency calls and emergency services will collectively be referred to as emergency communications. The emergency communications include any type of emergency communications through any type of communications including Packet Switched (PS) emergency communications, Circuit Switched (CS) emergency communications, Internet Protocol (IP) Multimedia Subsystem (IMS) emergency communications, etc.

For ease in explanation, Access Stratum (AS) (i.e., evolved Node B (eNB)) features and Non Access Stratum (NAS) (i.e., Core Network (CN)) features of the techniques for supporting emergency communications in a wireless communication system will be separately described below. An eNB may be referred to as a Base Station (BS), a Base Transceiver Station (BTS), an access point, a Radio Access Point (RAN), a cell etc. Further, an eNB may be shared between multiple CNs (i.e., Public Land Mobile Networks (PLMNs)). When multiple CNs share an eNB, it may be referred to as a shared network environment. In this case, it is possible that different combinations of eNB and CN support emergency communications and other combinations do not. Here, when emergency communications are allowed at the eNB, emergency communications may not be allowed at a given CN. In this case, the eNB may route the emergency communications to an appropriate CN. However, when the eNB does not support emergency communications, the eNB may reject the emergency communications, thereby allowing User Equipment (UE) to redirect itself to another cell. A UE may be referred to as a Mobile Station, a terminal, a subscriber unit, a station, etc.

Features of AS

Hereafter, AS features of the techniques for supporting emergency communications in a wireless communication system will be described. A UE may determine there is network support for emergency communications based on one of two exemplary implementations. In a first exemplary implementation, a UE may determine if there is network support for emergency communications based on an indication that may be included in broadcast information from an eNB. In a second exemplary implementation, a UE may determine if there is network support for emergency communications based on restrictions applicable for different access classes.

In the first exemplary implementation, the UE may operate differently depending on whether it is in a normal service mode or a limited service mode.

When the UE is in the normal service mode (i.e., a normal camped state), the UE checks for the indication in cell broadcast information of the eNB on which the UE is camped. The indication may be an explicit indication. Further, the indication may indicate whether the eNB in combination with at least one CN supports emergency communications. In addition, the indication may be referred to as an emergency call support indication. The indication may not identify a CN that supports the emergency communications. Here, the UE may check for the indication in the cell broadcast information before or in response to wanting to perform emergency communications. If the UE wants to perform emergency communications and the network supports emergency communications, the UE proceeds to establish emergency communications. However, if the UE wants to perform emergency communications and the network does not support emergency communications, the UE may operate in one of three ways. First, the UE may send a message to the eNB to release an existing network connection and redirect itself to another cell in order to perform the emergency communications. Second, the UE may check the access class barring information and redirect itself to another Radio Access Technology (RAT) or PLMN if the access barring allows the UE to perform emergency communications without informing the network. Third, the UE may check the access class barring information and send a message to the network requesting to redirect itself to another cell.

When the UE is in the limited service mode, the UE makes camping decisions based on the indication in the cell broadcast information and does not camp on eNBs that do not support emergency communications.

In the second exemplary implementation, UEs may determine if the network supports emergency communications based on restrictions (e.g., access restrictions) applicable in a given cell for different access classes. Here, while camping on a given eNB, the UE may determine (based on its access class) whether or not emergency communications are barred in a given cell from the related access information included in a cell broadcast message.

If emergency communications are not barred in the cell, the UE may remain camped on the cell and may perform emergency communications when it desires to do so. However, if emergency communications are barred in the cell, the UE may re-select another RAT or PLMN. This will avoid the UE from camping on limited service cells that do not support emergency communications.

If the UE, while camping, is unable to determine if the eNB supports emergency communications, the UE may camp on that eNB and determine if that eNB supports emergency communications.

To determine if the eNB supports emergency communications, the UE may originate emergency communications, and upon receiving a response to its connection origination, the UE may determine whether emergency communications are supported. Here, the response under consideration may either be at AS level using a RRCConnectionRequest message in 3GPP LTE or at the NAS level using an attach request. The UE may determine whether emergency communications are supported based on the response to its connection origination in one of three ways. In the first way, a rejection may be received from the eNB. The rejection may include a cause of the rejection with the cause being that emergency communications are not supported. The rejection may be, in the case of an AS message, a RRCConnectionReject message, or in the case of NAS message, an attach rejection message. In the second way, a rejection may be received from the eNB. Here, based on the rejection, the UE may conclude that the only reason the establishment of the emergency communications is rejected is that emergency communications are not supported in the cell. In the third way, the response from the network (either the Radio Access Network (RAN) or CN) may indicate possible redirection information for the UE, where the network is 'reasonably' sure that UE may be able to establish emergency communications.

Once the UE determines that emergency communications are not supported in the cell, the UE may perform suitable actions, such as those described below. One such action is for the UE to indicate to a user of the UE via a user interface that emergency communications are not possible. Here, the UE may also indicate suitable options (e.g., cells from another RAT and/or PLMN). The user may then select another RAT and/or PLMN.

Another such action is, if the UE is not able to make an emergency call while in a connected mode because the network does not temporarily or permanently support emergency communications, the UE may send a message to the network to request a release of the existing connection.

Yet another such action is that the UE may decide to move to another RAT and/or PLMN based on the support of emergency communications in a current cell and on emergency access barring information of that cell. For example if emergency communications are not supported, but the emergency access barring information indicates that emergency communications are not barred, then the UE may decide to reselect another cell of a different RAT and/or PLMN.

Still another such action is that the UE makes a decision to move to another RAT and/or PLMN only after receiving a message including redirection information from the network when the UE requests the network to release the connection for non availability of emergency communications support.

Another such action is that the UE may also indicate that the reason for terminating the connection is emergency communications.

Yet another such action is that when the network provides redirection information so that the UE may move to another cell, including those in other RATs and/or PLMNs, where the UE may (possibly) originate emergency communications, the UE searches for one of those cells (including those in the other RATs and/or PLMNs) where it may (possibly) originate emergency communications.

Features of NAS

Hereafter, NAS features of the techniques for supporting emergency communications in a wireless communication system will be described below. The RAN may maintain, store, and/or know about the capability of one or more CNs that share the RAN with respect to the support of emergency communications. Further, the CN may inform the UE about its capability to support an emergency communications in any of various CN response messages. Here, the information about the CN support of emergency communications may also be broadcast by the network and/or cell as an indicator.

When more than one CN shares the RAN, the indicator may indicate that the emergency communications are supported if at least one CN supports the emergency communications.

When the UE is to originate emergency communications and based on the aforementioned knowledge it knows that the CN does not support an emergency communications, the UE may terminate an existing connection (e.g., radio connection). Upon the termination of the existing connection, the UE may originate emergency communications. The access network may now forward the emergency communications to a CN access point that supports emergency communications.

Alternatively, based on the above, the UE may decide to request the RAN to terminate the Radio Resource Control (RRC) connection by sending a message to the RAN. The network may then terminate the connection. Upon the termination of the existing connection, the UE may originate emergency communications. The access network may now forward the emergency communications to a CN access point that supports emergency communications.

Irrespective of which of the above described features are implemented (fully or in part), in another exemplary embodiment, the UE may send the initiation of the emergency communications to a CN access point (e.g., a Mobility Management Entity (MME)) that the UE is connected to by sending a service request for emergency communications. The CN access point may then inform the RAN about another CN access point that supports emergency communications, if this access point itself does not support emergency communications. In that case the original CN access point may release the CN connection with the UE and the RAN may connect the UE to the new CN access point. However, if the original CN access point itself supports emergency communications, then the original CN access point may directly provide the emergency communications to the UE.

Irrespective of which of the above described features are implemented (fully or in part), in another exemplary embodiment, the UE may send the initiation of the emergency communications to the CN access point (e.g., a Mobility Management Entity (MME)) that the UE is connected to by sending a service request for emergency communications. The concerned CN access point may then inform the radio access network that the UE is trying to perform emergency communications, which the CN access node does not support. The RAN may then connect the UE to a new CN access point that supports the emergency communications requested by the UE. To do so, the original radio connection may be terminated (with appropriate cause) and a new connection may be established or, the existing UE-CN connection may be moved to the new CN access point.

An example of an emergency access mechanism is provided below in Table 1.

TABLE 1

| Service Area Type | Access Class (AC) 0-9, 11 and 15 (in non Home PLMN/Extended Hone PLMN) and AC 12-14 in visited country. | AC 11 and 15 in Home PLMN/Extended Hone PLMN | AC 12-14 in home county |
|---|---|---|---|
| Camped Normally | In both options, UE shall originate an emergency call only if emergency communications are allowed in cell. | In option 1: UE shall try to reselect another cell when it has to originate emergency communications. | |
| Limited Service | In both options, UE shall camp on the cell only if emergency communications are allowed in cell. | In options 2: UE shall originate emergency communications and upon reception of RRCConnectionReject it comes to know the emergency communications are not supported. | |

Here, Option 1 denotes an explicit indication in broadcast information from the cell/network. Option 2 denotes that the UE originates emergency communications and upon receiving a response to its connection origination (the response under consideration could either be at the AS level as using RRCConnectionRequest message in LTE or at the NAS level e.g. using an attach request) it comes to know if emergency communications are supported or not.

An example of accessing emergency communications is described below with reference to FIG. 1.

FIG. 1 is a flowchart for accessing emergency communications according to an exemplary embodiment of the present invention.

Referring to FIG. 1, in step 102, the UE initiates one of an emergency camping procedure or a normal camping procedure. If the UE initiates an emergency camping procedure, the UE, in step 104, checks system information to determine if the network supports emergency communications. This determination may be based on explicit indications sent by the network in broadcast and/or dedicated messages. Here, the indications may indicate whether or not the network supports emergency communications. In addition, the UE may determine whether the network supports emergency communications based on information, such as access barring and/or access restriction information.

If the UE determines that the network does not support emergency communications in step 104, the UE may attempt to camp on another RAT and/or PLMN in step 106. Here, the other RAT, PLMN, Frequency and/or cell may be a RAT, PLMN, Frequency and/or cell that supports emergency communications. Thereafter, the procedure ends.

However, if, in step 104, the UE determines that the network does support emergency communications or the UE cannot determine that the network does not support emergency communications, the UE camps on the cell for limited service in step 108. Thereafter, the procedure proceeds to step 116, which is described further below.

Returning to step 102, if the UE initiates an emergency camping procedure, the UE, in step 110, camps for normal service. In step 112, the UE checks system information to determine if the network supports emergency communications. This determination may be based on explicit indications sent by the network in broadcast and/or dedicated messages. Here, the indications may indicate whether or not the network supports emergency communications. In addition, the UE may determine whether the network supports emergency communications based on information, such as access barring and/or access restriction information.

If the UE determines that the network does not support emergency communications in step 112, the UE may attempts to camp on another RAT and/or PLMN in step 114. Here, the other RAT, PLMN, Frequency and/or cell may be a RAT, PLMN, Frequency and/or cell that supports emergency communications. Thereafter, the procedure ends. However, if, in step 112, the UE determines that the network does support emergency communications or the UE cannot determine that the network does not support emergency communications, the procedure proceeds to step 116.

In step 116, the UE sends a connection request for emergency communications to the cell it is camped on. In step 118, the UE receives a response from the network to the connection request for emergency communications. The response is either an acceptance of the connection request or a rejection of the connection request.

If the UE receives a rejection of the connection request the in step 118, the UE may attempts to camp on another RAT and/or PLMN in step 120. Here, the UE may receive information on which other RAT and/or PLMN may support emergency communications. Thereafter, the procedure ends.

However, if, in step 118, the received response is an acceptance of the connection request, the UE establishes emergency communications in step 122. Thereafter, the procedure ends.

An example of a method for a RAN serving at least one CN to support emergency communications of a UE is described below with reference to FIG. 2.

Figure 2:
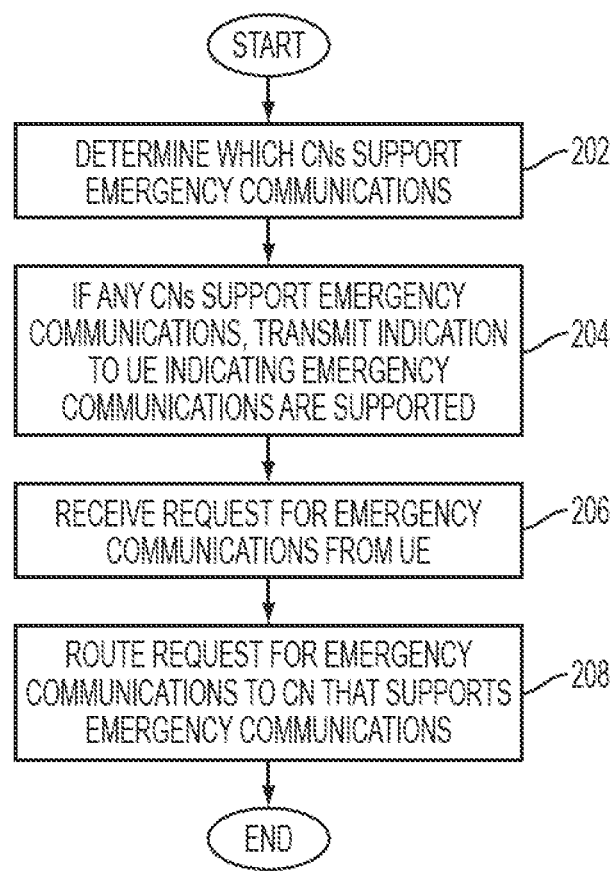
FIG. 2 is a flowchart for a Radio Access Network (RAN) serving at least one Core Network (CN) to support emergency communications of a User Equipment (UE) according to an exemplary embodiment of the present invention.

FIG. 2 is a flowchart for a RAN serving at least one CN to support emergency communications of a UE according to an exemplary embodiment of the present invention.

Referring to FIG. 2, in step 202, the RAN determines whether at least one CN in a shared network environment supports emergency communications. In step 204, if the RAN determines that the at least one CN in the shared network environment supports emergency communications, the RAN transmits an emergency call support indication to the UE indicating that emergency communications are supported. Here, the emergency call support indication may not identify a CN. Also, if it is determined by the RAN that none of the at least one CN supports emergency communications, the RAN may transmit the emergency call support indication to the UE indicating that emergency communications are not supported.

In step 206, the RAN receives a request for emergency communications from the UE. Here, the request for emergency communications from the UE may not identify a CN. The request for emergency communications from the UE may be a request for an IMS emergency call. The request for emergency communications from the UE may be received after the UE disconnects from a CN that does not support emergency communications. In step 208, the RAN routes the request for emergency communications to another CN that supports emergency communications in the shared network environment, if a given CN does not support emergency communications. Here, the RAN may be an eNB and the CN may be a PLMN.

An example of a method for a UE to support emergency communications with a RAN serving at least one CN is described below with reference to FIG. 3.

Figure 3:
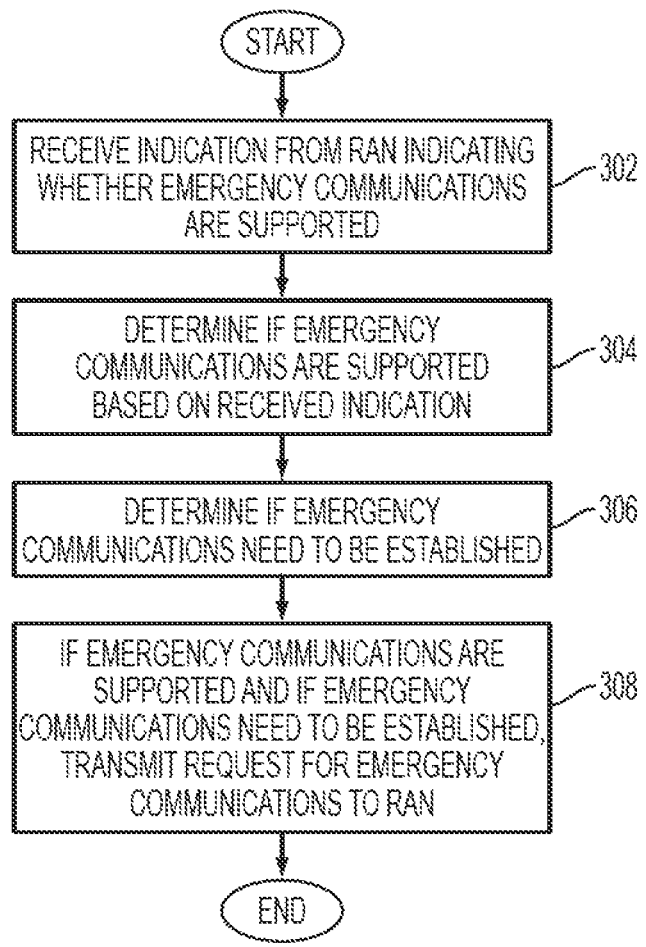
FIG. 3 is a flowchart for a UE to support emergency communications with a RAN serving at least one CN according to an exemplary embodiment of the present invention.

FIG. 3 is a flowchart for a UE to support emergency communications with a RAN serving at least one CN according to an exemplary embodiment of the present invention.

Referring to FIG. 3, in step 302, the UE receives an emergency call support indication from the RAN indicating whether emergency communications are supported in at least one CN in a shared network environment. Here, the emergency call support indication may not identify a CN. In step 304, the UE determines if emergency communications are supported in any of the at least one CN in the shared network environment based on the received emergency call support indication. In step 306, the UE determines if emergency communications need to be established. In step 308, if the UE determines that emergency communications are supported in any of the at least one CN of the shared network environment and also if the UE determines that emergency communications need to be established, the UE transmits a request for emergency communications to the RAN. Here, the request for emergency communications may not identify a CN. The request for emergency communications from the UE may be a request for an IMS emergency call. Here, if the UE is connected via the RAN to a CN that does not support emergency communications and if emergency communications need to be established, the UE may terminate the connected via the RAN to the CN that does not support emergency communications and then transmit a request for emergency communications to the RAN. Here, the RAN may be an eNB and the CN may be a PLMN.

Figure 4:
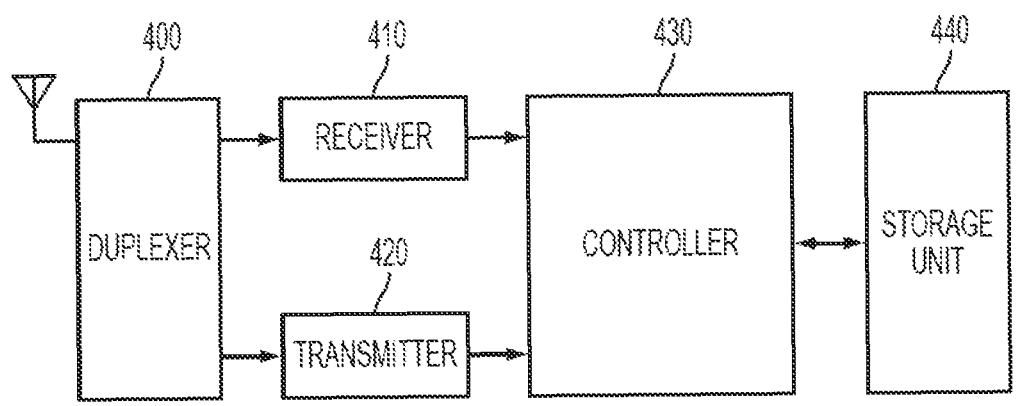
FIG. 4 is a block diagram illustrating a UE in a wireless communication system according to an exemplary embodiment of the present invention.

FIG. 4 is a block diagram illustrating a UE in a wireless communication system according to an exemplary embodiment of the present invention.

Referring to FIG. 4, the UE includes a duplexer 400, a receiver 410, a transmitter 420, a controller 430, and a storage unit 440. The UE may include any number of additional structural elements. However, a description of additional structural elements of the UE is omitted for conciseness.

The duplexer 400 transmits a transmission signal provided from the transmitter 420 via an antenna, and provides a reception signal from the antenna to the receiver 410 according to a duplexing scheme.

The receiver 410 converts the reception signal provided from the duplexer 400 into a baseband signal, and provides the baseband signal to the controller 430. For example, when the wireless communication system uses an Orthogonal Frequency Division Multiplexing (OFDM) scheme, the receiver 410 includes a Radio Frequency (RF) processor, an Analog/Digital Converter (ADC), an OFDM demodulator, and a decoder. Accordingly, the RF processor converts an RF signal provided from the duplexer 400 into a baseband analog signal. The ADC converts the analog signal provided from the RF processor into digital sample data. The OFDM demodulator transforms sample data in a time domain provided from the ADC into data in a frequency domain by performing a Fast Fourier Transform (FFT). The decoder demodulates and decodes a signal provided from the OFDM demodulator according to a Modulation and Coding Scheme (MCS) level.

The controller 430 controls overall operations of the UE. The operations of UE include any of the operations explicitly or implicitly described above as being performed by a UE.

For example, the controller may control the receiver 410 and transmitter 420, may control to receive an emergency call support indication from the RAN indicating whether emergency communications are supported in at least one CN in a shared network environment, may control to determine if emergency communications are supported in any of the at least one CN in the shared network environment based on the received emergency call support indication, may control to determine if emergency communications need to be established, and may control, if it is determined that emergency communications are supported and also if it is determined that emergency communications need to be established, to transmit a request for emergency communications to the RAN.

The transmitter 420 converts a transmission signal into an RF signal, and provides the RF signal to the duplexer 400 under control of the controller 430. For example, when the wireless communication system uses an OFDM scheme, the transmitter 420 includes an encoder, an OFDM modulator, a Digital/Analog Converter (DAC) and an RF processor. The encoder encodes and modulates a transmission signal according to an MCS level under control of the controller 430. The OFDM modulator converts data in the frequency domain provided from the encoder into sample data (i.e., an OFDM symbol) in a time domain by performing an Inverse FFT (IFFT). The DAC converts sample data provided from the OFDM modulator into an analog signal. The RF processor converts a baseband analog signal provided from the DAC into an RF signal.

The storage unit 440 stores programs required for overall operations of the UE and various data, including any of the information and/or the algorithms discussed herein as being received, transmitted, retained or used by a UE.

Figure 5:
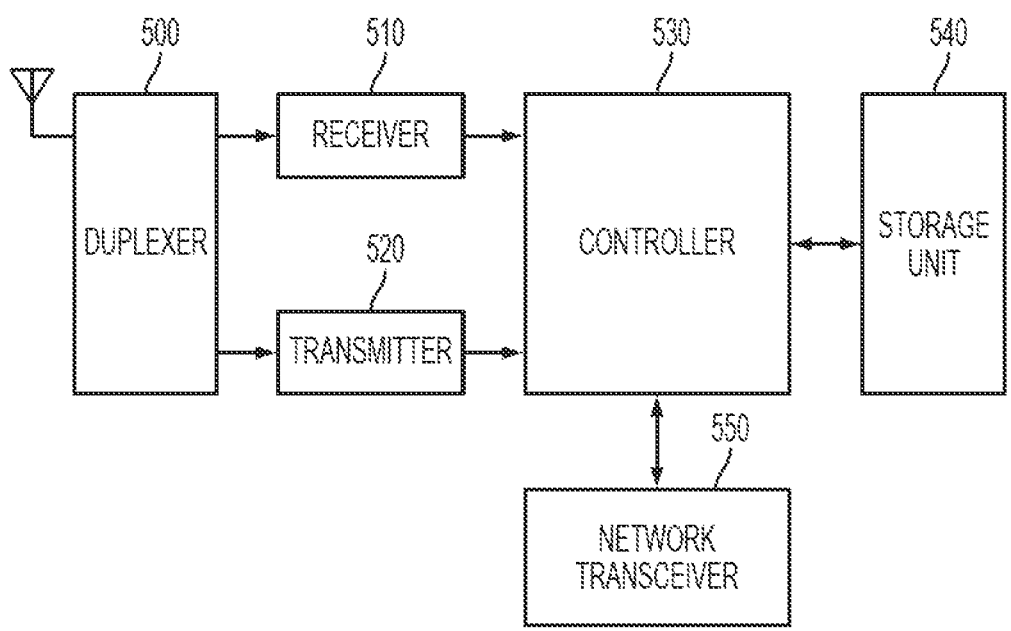
FIG. 5 is a block diagram illustrating an evolved Node B (eNB) in a wireless communication system according to an exemplary embodiment of the present invention.

FIG. 5 is a block diagram illustrating an eNB in a wireless communication system according to an exemplary embodiment of the present invention.

Referring to FIG. 5, the eNB includes a duplexer 500, a receiver 510, a transmitter 520, a controller 530, a storage unit 540, and a network transceiver 550. The eNB may include any number of additional structural elements. However, a description of additional structural elements of eNB is omitted for conciseness. The eNB may be any type of eNB.

The duplexer 500 transmits a transmission signal provided from the transmitter 520 via an antenna, and provides a reception signal from the antenna to the receiver 510 according to a duplexing scheme.

The receiver 510 converts a reception signal provided from the duplexer 500 into a baseband signal and provides the baseband signal to the controller 530. For example, when the wireless communication system uses an OFDM scheme, the receiver 510 includes an RF processor, an ADC, an OFDM demodulator and a decoder. The RF processor converts an RF signal provided from the duplexer 500 into a baseband analog signal. The ADC converts the analog signal provided from the RF processor into digital sample data. The OFDM demodulator converts sample data in the time domain provided from the ADC into data in the frequency domain by performing FFT. The decoder demodulates and decodes a signal provided from the OFDM demodulator according to an MCS level.

The controller 530 controls overall operations of the eNB. The operations of the eNB include any of the operations explicitly or implicitly described above as being performed by an eNB, a cell, a RAN, an access point, etc. For example, the controller 530 may control the receiver 510, transmitter 520 and network transceiver 550, may control to determine whether at least one CN in a shared network environment supports emergency communications, may control, if it is determined that any of the at least one CN in the shared network environment supports emergency communications, to transmit an emergency call support indication to the UE indicating that emergency communications are supported, may control to receive a request for emergency communications from the UE, and may control to route the request for emergency communications to another CN that supports emergency communications in the shared network environment, if a given CN does not support emergency communications.

The transmitter 520 converts a transmission signal into an RF signal and provides the RF signal to the duplexer 500 under control of the controller 530. For example, when the wireless communication system uses an OFDM scheme, the transmitter 520 includes an encoder, an OFDM modulator, a Digital/Analog Converter (DAC) and an RF processor. The encoder encodes and modulates a transmission signal according to an MCS level under control of the controller 530. The OFDM modulator converts data in the frequency domain provided from the encoder to sample data (i.e., an OFDM symbol) in the time domain by performing IFFT. The DAC converts sample data provided from the OFDM modulator into an analog signal. The RF processor converts a baseband analog signal provided from the DAC into an RF signal.

The storage unit 540 stores programs required for overall operations of the eNB and various data including any of the information and/or algorithms discussed herein as being received, transmitted, retained or used by an eNB, such as an eNB.

The network transceiver 550 facilities communication with other network entities within a wireless communication system, such as CNs or PLMNs.

Certain aspects of the present invention may also be embodied as computer readable code on a computer readable recording medium. A computer readable recording medium is any data storage device that can store data, which may be thereafter read by a computer system. Examples of the computer readable recording medium include Read-Only Memory (ROM), Random-Access Memory (RAM), CD-ROMs, magnetic tapes, floppy disks, and optical data storage devices. The computer readable recording medium can also be distributed over network coupled computer systems so that the computer readable code is stored and executed in a distributed fashion. Also, functional programs, code, and code segments for accomplishing the present invention may be easily construed by programmers skilled in the art to which the present invention pertains.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for a User Equipment (UE) to support emergency communications with a Radio Access Network (RAN) serving at least one Core Network (CN), the method comprising:

receiving an emergency call support indication from the RAN indicating whether emergency communications are supported or not in at least one CN in a shared network environment;

determining whether emergency communications are supported in any of the at least one CN in the shared network environment based on the received emergency call support indication;

determining whether emergency communications need to be established;

when it is determined that emergency communications are supported in any of the at least one CN of the shared network environment and also when it is determined that emergency communications need to be established, transmitting a request for emergency communications to the RAN; and when the UE is connected via the RAN to a CN that does not support emergency communications and when emergency communications need to be established, terminating the connection via the RAN to the CN that does not support emergency communications and then transmitting a request for emergency communications to the RAN.

2. The method of claim 1, wherein the request for emergency communications does not identify a specific CN.

3. The method of claim 1, wherein the request for emergency communications comprises a request for an Internet Protocol (IP) Multimedia Subsystem (IMS) emergency call.

4. The method of claim 1, wherein the RAN comprises an evolved Node B (eNB) and the CN comprises a Public Land Mobile Network (PLMN).

5. The method of claim 1, wherein the emergency call support indication does not identify a specific CN.

6. A User Equipment (UE) apparatus to support emergency communications with a Radio Access Network (RAN) serving at least one Core Network (CN), the apparatus comprising:

a transmitter for transmitting signals to the RAN;

a receiver for receiving signals from the RAN; and a controller for controlling the receiver and transmitter, for controlling to receive an emergency call support indication from the RAN indicating whether emergency communications are supported or not in at least one CN in a shared network environment, for controlling to determine whether emergency communications are supported in any of the at least one CN in the shared network environment based on the received emergency call support indication, for controlling to determine whether emergency communications need to be established, and for controlling, when it is determined that emergency communications are supported and also when it is determined that emergency communications need to be established, to transmit a request for emergency communications to the RAN, wherein the controller further controls, when the UE is connected via the RAN to a CN that does not support emergency communications and when emergency communications need to be established, to terminate the connection via the RAN to the CN that does not support emergency communications and then transmit a request for emergency communications to the RAN.

7. The apparatus of claim 6, wherein the request for emergency communications does not identify a specific CN.

8. The apparatus of claim 6, wherein the request for emergency communications comprises a request for an Internet Protocol (IP) Multimedia Subsystem (IMS) emergency call.

9. The apparatus of claim 6, wherein the RAN comprises an evolved Node B (eNB) and the CN comprises a Public Land Mobile Network (PLMN).

10. The apparatus of claim 6, wherein the emergency call support indication does not identify a specific CN.

* * * * *